(12) United States Patent
Casulli

(10) Patent No.: US 10,778,271 B1
(45) Date of Patent: Sep. 15, 2020

(54) SYSTEM AND METHOD FOR ANALYZING SIGNALS TRAVELLING ALONG TRACK CIRCUITS OF RAILWAY LINES, AND RELATED PORTABLE SIGNAL ANALYZING DEVICE

(71) Applicant: ALSTOM Transport Technologies, Saint-Ouen (FR)

(72) Inventor: Giuseppe Casulli, Bari (IT)

(73) Assignee: ALSTOM Transport Technologies, Saint-Ouen (FR)

( * ) Notice: Subject to any disclaimer, the term of this patent is extended or adjusted under 35 U.S.C. 154(b) by 0 days.

(21) Appl. No.: 16/506,255

(22) Filed: Jul. 9, 2019

(51) Int. Cl.
*B61L 23/00* (2006.01)
*H04B 1/18* (2006.01)
*B61L 1/18* (2006.01)

(52) U.S. Cl.
CPC ............... *H04B 1/18* (2013.01); *B61L 1/181* (2013.01); *B61L 23/00* (2013.01)

(58) Field of Classification Search
CPC .. B61L 1/18; B61L 1/181; B61L 1/187; B61L 1/188
See application file for complete search history.

(56) References Cited

U.S. PATENT DOCUMENTS

| | | | | |
|---|---|---|---|---|
| 4,307,860 A * | 12/1981 | Kuhn | ................... | B61L 29/286 246/125 |
| 4,641,803 A * | 2/1987 | Brown | .................. | B61L 23/166 246/122 R |
| 5,145,131 A * | 9/1992 | Franke | ..................... | B61L 1/188 246/122 R |
| 6,290,187 B1 * | 9/2001 | Egami | ....................... | B61L 1/06 246/122 R |
| 6,641,803 B1 * | 11/2003 | Kahre | ..................... | A61K 8/342 424/401 |
| 2004/0181321 A1 * | 9/2004 | Fries | ........................ | B61L 1/187 701/19 |
| 2011/0011985 A1 * | 1/2011 | Hogan | ..................... | H04L 27/10 246/34 R |
| 2013/0284859 A1 * | 10/2013 | Polivka | ............... | B61L 27/0055 246/34 R |
| 2013/0334373 A1 * | 12/2013 | Malone, Jr. | ........... | B61L 23/044 246/2 R |
| 2017/0331317 A1 * | 11/2017 | Wheeland | ............... | H02J 50/20 |
| 2018/0281830 A1 * | 10/2018 | Lanteri | ................... | B61L 1/188 |
| 2019/0011985 A1 * | 1/2019 | Buck | ....................... | G06Q 40/04 |
| 2019/0193761 A1 * | 6/2019 | Weingartner | ........ | G01N 27/041 |

* cited by examiner

*Primary Examiner* — Kevin Kim
(74) *Attorney, Agent, or Firm* — Troutman Pepper Hamilton Sanders LLP

(57) ABSTRACT

System, method and portable device for analyzing signals travelling along track circuits of railway lines, wherein at least one antenna captures, in a contactless manner, a plurality of signals travelling along a track circuit, and a demodulator is adapted to separate into individual signals the plurality of signals captured by the antenna and selectively demodulate one or more of the captured signals. An interface is adapted for transferring, to a user interface, data indicative of the demodulated signals. Each demodulated signal is displayed on a screen for a user to trigger any needed corrective action.

9 Claims, 4 Drawing Sheets

SYSTEM AND METHOD FOR ANALYZING SIGNALS TRAVELLING ALONG TRACK CIRCUITS OF RAILWAY LINES, AND RELATED PORTABLE SIGNAL ANALYZING DEVICE

TECHNICAL FIELD

The present invention relates in general to the field of signal analyses, and more in particular to a system and a method for analyzing signals travelling along track circuits of railway lines, as well as to a related portable track circuit signal analyzing device.

BACKGROUND OF THE DISCLOSURE

In the field of railway applications, it is known the use of track circuits performing critical safety functions in the monitoring and management of traffic over a railway network. In particular, rail track circuits are primarily used to detect whether a train is present on a track section; they can be also used to detect broken rails within the track section, and/or to transmit signal aspect information through the rails, for example to communicate movement authorities to transiting trains.

To this end, track circuits use electrical signals applied to the rails and a typical track circuit includes a certain number of rails, forming a given track section, which are in electrical series with a signal transmitter and a signal receiver, usually positioned at respective ends of the given track section. The signal transmitter applies a voltage to the rails and a corresponding current signal is detected by the receiver.

Even if at present track circuits perform properly, they are still subject to certain inconvenients and issues. For example, many signals of different type, such as for instance train detection signals or TDs, CAB signals for allowing train speed reduction, et cetera, are output by the transmitter towards the associated receiver or to a transiting train and may travel at the same time over the rails of a track circuit. This makes difficult to properly perform both tuning of the various types of signals to be received, and maintenance of the track circuit as a whole.

In particular, each signal output by a transmitter can be tuned for example in frequency, amplitude, current, phase and the receiver shall be correspondingly tuned to accept and recognize the signal within a range of frequency, amplitude, timing, phase, duty cycle. The various parameters have to be tuned taking into account other variables, such as the length of the tracks, passages of trains, et cetera.

Nowadays tuning is carried out by regulating one signal at a time using traditional metering instruments with the intervention of two or more technicians on the field. After the initial tuning is completed, when all relevant signals are switched-on all together, they usually interfere among each other, especially when the respective carrier frequencies are mutually close; as a consequence, it is possible that further tunings are needed.

Sometimes it is also possible that at the same type on the same track circuit are present two or more signals of the same type, namely a first one correctly relevant for the specific track circuit, and one or more other signals which instead originate from other track circuits. In these cases, a technician performing tuning would not be able to understand that measurements and tuning executed via current state of the art solutions may be affected by a possible error.

Some further issues and distortions reside in the fact that the travelling signals are sensitive to operational and environmental conditions that impact the initial electrical characteristics of the relevant track section.

As a matter of fact, track circuits may not be configured optimally for the actual conditions and require to perform intense maintenance interventions, wherein they are manually re-calibrated by technicians on the field. Clearly, such maintenance interventions are costly, inefficient, and/or time-consuming. Indeed, track circuit configuration and adjustments require lots of time from maintenance forces and temporarily halt the movement of trains, thus resulting in perturbation of the traffic and in substantial financial losses.

BRIEF DESCRIPTION OF THE INVENTION

Hence, it is evident that there is room and desire for improvements in the way track circuits are in general operated, and in particular how tuning, commissioning and maintenance of track circuits are performed.

The present disclosure is aimed at providing a solution to this end and, in one aspect, it provides a signal analyzing system for track circuits of railway lines, comprising:
- at least one antenna for contactlessly capturing a plurality of signals travelling along a track circuit,
- at least one demodulator adapted to separate into individual signals the plurality of signals captured by said at least one antenna and selectively demodulate at least one of the separated signals, and
- an interface adapted at least for transferring, to a user interface, data indicative of the at least one demodulated signal.

In another aspect, the present disclosure provides a method for analyzing signals travelling along track circuits of railway lines, comprising at least the following steps:
- capturing, in a contactless manner, a plurality of signals travelling along a track circuit via at least one antenna,
- separating into individual signals the plurality of signals captured by said at least one antenna and selectively demodulating at least one of the separated signals via at least one demodulator, and
- transferring, via an interface, data indicative of the at least one demodulated signal towards a user interface.

In a further aspect, the present disclosure provides a portable track circuit signal analyzing device comprising
- an antenna for contactlessly capturing a plurality of signals travelling along a track circuit,
- at least one demodulator adapted to separate into individual signals the plurality of signals captured by said at least one antenna and selectively demodulate at least one of the separated signals, and
- an interface adapted at least for transferring, to a user interface, data indicative of the at least one demodulated signal.

BRIEF DESCRIPTION OF THE DRAWINGS

Detailed characteristics and advantages will become apparent from the description of some preferred but not exclusive exemplary embodiments of a system, a method, and a related portable track circuit signal analyzing device according to the present disclosure, illustrated only by way of non-limitative examples with the accompanying drawings, wherein.

DETAILED DESCRIPTION OF THE DISCLOSURE

Figure 1:
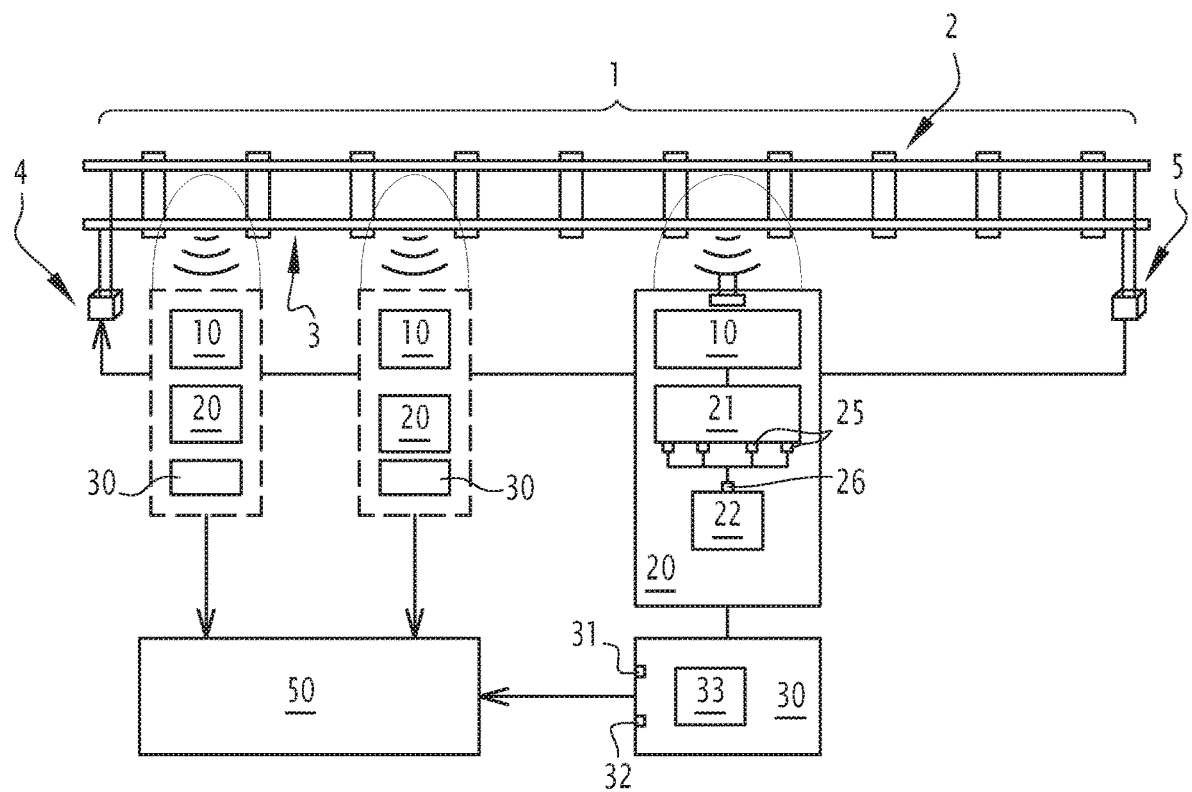
FIG. 1 is a block diagram schematically illustrating a signal analyzing system according to the present disclosure applied to a track circuit of a railway line.

It should be noted that in the detailed description that follows, identical or similar components, either from a structural and/or functional point of view, may have the same reference numerals, regardless of whether they are shown in different embodiments of the present disclosure. It should be also noted that in order to clearly and concisely describe the present disclosure, the drawings may not necessarily be to scale and certain features of the disclosure may be shown in somewhat schematic form.

Further, when the term "adapted" or "arranged" or "configured" or "shaped", is used herein while referring to any component as a whole, or to any part of a component, or to a combination of components, it has to be understood that it means and encompasses correspondingly either the structure, and/or configuration and/or form and/or positioning. In particular, for electronic and/or software means, each of the above listed terms means and encompasses electronic circuits or parts thereof, as well as stored, embedded or running software codes and/or routines, algorithms, or complete programs, suitably designed for achieving the technical result and/or the functional performances for which such means are devised.

Figure 2:
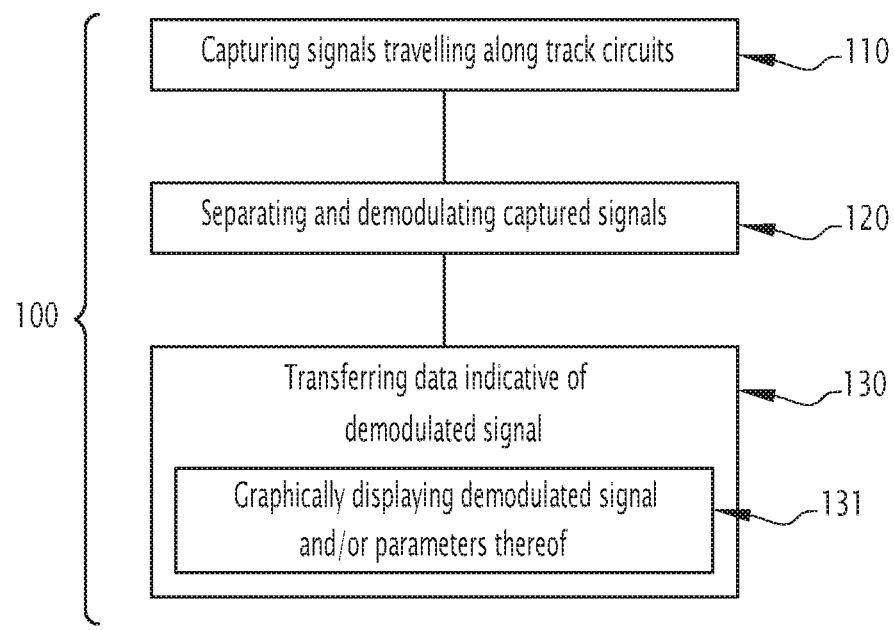
FIG. 2 is a flowchart schematically depicting a method for analyzing signals travelling along track circuits of railway lines according to the present disclosure.

A signal analyzing system and a corresponding method for analyzing signals travelling along track circuits of railway lines according to the present disclosure are illustrated in FIG. 1 and in FIG. 2, respectively, and therein indicated by the corresponding overall reference numbers 100 and 200.

The system 100 and method 200 are suitable to be used in relation with a track circuit of a railway line, schematically represented in FIG. 1 by the reference number 1. According to solutions well known in the art and therefore not described in details herein, a track circuit 1 generally comprises a track section having a predetermined overall length formed by a plurality of rails 2 and 3 arranged in parallel to form the track section on which railway vehicles transit. Further, the track circuit 1 comprises a transmitter 4 and a receiver 5 positioned at the two corresponding ends of the track section 2.

As illustrated in FIG. 1, the signal analyzing system 100 according to the present disclosure comprises:
- at least one antenna 10, which is configured for contactlessly capturing a plurality of signals $I_1, I_2, I_n$, travelling along the associated track circuit 1;
- at least one demodulator or demodulating unit, indicated by the cumulative reference number 20, which is adapted to separate into individual signals the plurality of signals $I_1, I_2, I_n$ captured by the at least one antenna 10 and selectively demodulate at least one of the separated signals, and
- an interface 30 adapted at least for transferring, to a user interface, data indicative of the at least one demodulated signal $I_d$.

In practice, the at least one antenna 10 is operatively coupled to a point of the associated track circuit 1, for example close to the receiver 5. The at least one antenna 10 detects and cumulatively captures, in a contactless manner, the various signals $I_1, I_2, I_n$ travelling along the track circuit 1. In turn, the at least one demodulator 20, which is in operative communication with the antenna 10, is configured to demodulate one or more of the captured signals $I_1, I_2, I_n$, and to isolate each signal of specific interest which, via the interface 30, can be graphically displayed on a screen 50. In this way an operator can analyze the entire signal or any interesting parameter or part thereof, and can validate the good behaviour of the isolated signal during commissioning or maintenance phases or may identify any potential issue and thus timely trigger corresponding corrective actions.

In one possible embodiment, the at least one antenna 10 is of the Extremely Low Frequency (ELF) type and is configured to capture signals, i.e. electromagnetic waves, travelling along the track circuit 1 having a frequency in the range comprised between 50 Hz and 50 kHz.

In another possible embodiment, the at least one antenna 10 of the ELF type is configured to capture signals travelling along the track circuit 1 having a frequency in the range comprised between 1 kHz and 20 kHz.

According to a possible embodiment, the at least one antenna 10 comprises a magnetic antenna.

In another possible embodiment, the at least one antenna 10 comprises a capacitive antenna.

Clearly, depending on the applications and specific needs it is possible to adopt one or more antennas 10 based on a combination of capacitive-magnetic types.

According to a possible embodiment of the system 100, the demodulator or demodulating unit 20 comprises a digital signal processor (DSP) 21 adapted to output signals, for example signals containing electrical parameters such as voltage and current values, indicative of the at least one demodulated signal Id.

The digital signal processor 21 can be conveniently adapted to selectively demodulate each of the captured signals $I_1, I_2, I_n$ and output electric signals each indicative of a corresponding demodulated signal.

The digital signal processor 21 can be of any type commercially available and suitably adapted, namely comprising circuitry and/or software-firmware, for performing the tasks foreseen within the frame of the present disclosure. For example, the digital signal processor 21 comprises an analog digital processing signal, having a chip, able to acquire the signals $I_1, I_2, I_n$ coming from the antenna 10 and to demodulate up to a certain numbers of signal carriers at the same time acting on corresponding trimmers. For each trimmer there is an output 25 where the demodulated signal will be provided.

Further, as illustrated in the exemplary embodiment of FIG. 1, the demodulator or demodulating unit 20 comprises an electronic board 22 adapted to receive the electrical signals output by the digital signal processor 21 and transfer them towards the interface 30.

In particular, according to a possible embodiment, the electronic board 22 is adapted to automatically select, namely digitally, the specific output, e.g. a trimmer, of the digital signal processor 21 where the electrical signals, indicative of a corresponding and demodulated target signal Id to be transferred towards the interface 30, are made available. Alternatively, the connection can be realized by cabling an input 26 of the electronic board 22 with a relevant output 25 of the digital signal processor 21. Clearly, also the electronic board 22 can be of any of any type commercially available, such as a dsPIC, comprising circuitry and/or software-firmware, to the extent necessary suitably tailored, for performing the tasks foreseen within the frame of the present disclosure.

According to possible embodiments, the interface 30 comprises at least one of a port 31 for cabled connection with the user interface, for example an Ethernet port, or a port 32 for wireless communication with the user interface.

Figure 4:
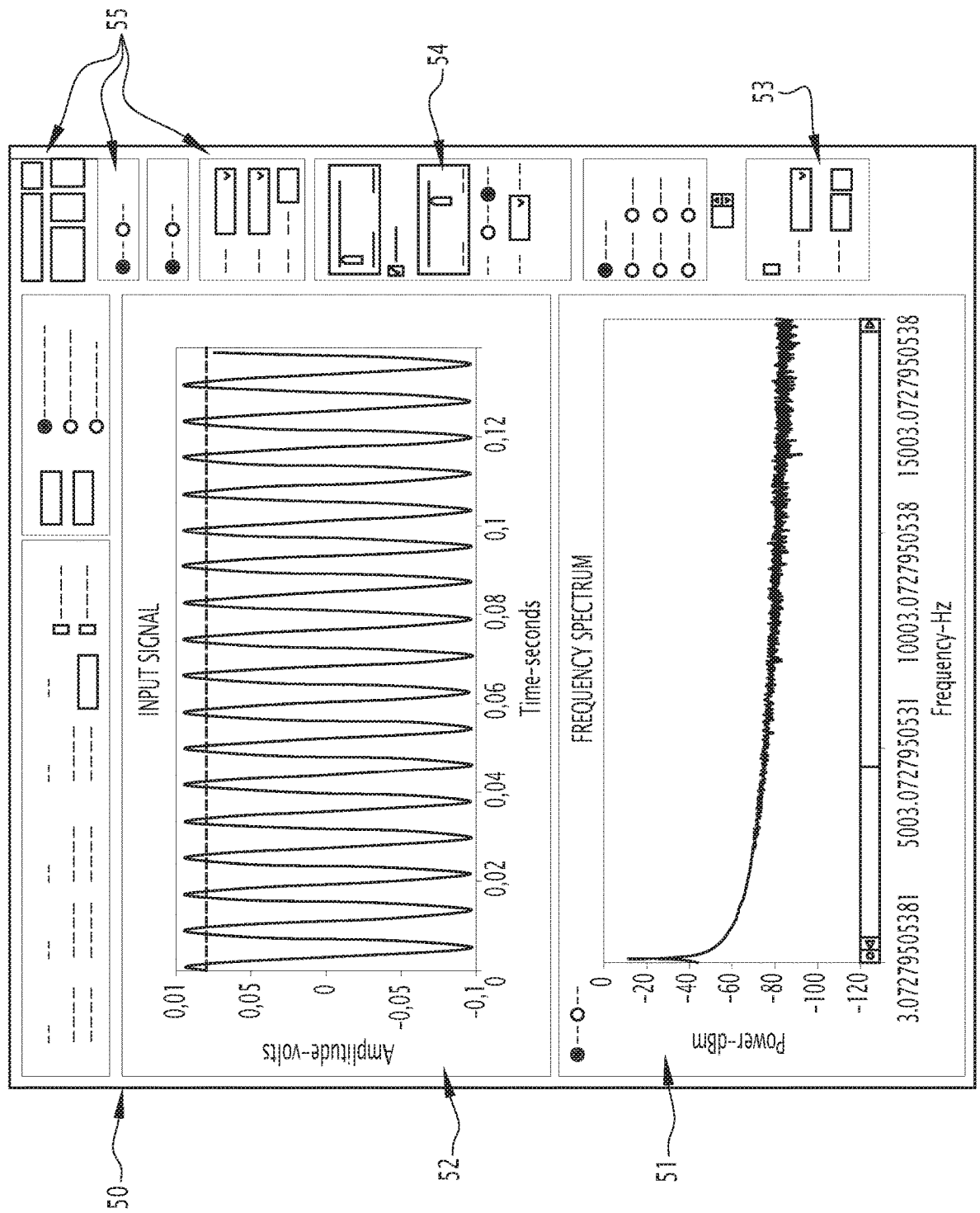
FIG. 4 is a schematic snapshot illustrating a graphical representation of a signal demodulated in accordance with the system and method according to the present disclosure.

Conveniently, in the system 100 according to the present disclosure, the interface 30 comprises a module 33 adapted to graphically display on a screen 50 at least one of the demodulated signal and one or more parameters indicative of the information content carried out by the demodulated signal, as for example illustrated in FIG. 4. In particular, the module 33 comprises a software including coded instructions for displaying the demodulated signal(s) and content thereof on the screen 50 and for example to perform real time Fast Fourier Transformation on the signal(s) processed, to determine the signal to noise ratio of the demodulated signal, to generate an Eye diagram and constellation, et cetera.

For instance, in the example illustrated in FIG. 4 the software of the module 33 graphically divides the screen 50 in different areas wherein, in a first area 51 there is plotted a frequency spectrum of the demodulated signal $I_d$, in a second area 52 there is graphically displayed the signal in relation to time. Further, there could be displayed also a signal intensity meter, a frequency meter associated with the frequency spectrum, volume level controls 53, various functional buttons 54, 55, for example for registering part of the signal replaying and fast forward moving along the registered part of the signals, et cetera.

According to a possible embodiment, the module 33 can be conveniently adapted to detect an indicator or marker contained in at least one demodulated signal, which is indicative of a defective status of the track switch 1 or part thereof, such as of a defective rail 3 or 4. For example, a signal travelling over the track circuit include inside a signature, i.e. the above mentioned indicator, univocally related to the mean in which it travels, e.g. the rails 2 and 3. If a rail has a fracture that is starting to interrupt the passage of current, a signal for detecting the presence of a train travelling over the rail from the transmitter 4 to the receiver 5 will be modulated in an identifiable way when a train is transiting. This identifiable way will be substantially always the same, and the module 33 can be adapted to recognize such identifier, for example exploiting the usual behaviour. In particular, the module 33, or any other module associated therewith, can make use of a trained neural network able to recognize all the TD signals that will have a behaviour that "seems" like the one used during a previous training, thus allowing to detect a possible fracture in a rail. The same can be likewise extended and applied to other signals for identifying other possible defects or issues.

According to a possible embodiment and as schematically represented in FIG. 1 in dotted lines, the system 100 can comprise a plurality of antennas 10 which can be positioned along a track circuit 1, spaced apart from each other, and a plurality of demodulators 20 each operatively connected to an associated antenna 10 of the plurality of antennas 10.

According to this embodiment, the interface 30 can comprise a unique module 33, acting as a kind of hub for all demodulators 20, which receives data transferred via the various communications ports 31 or 32, and adapted to graphically display on one or more screens 50, one or more of the transferred demodulated signals and one or more parameters indicative of the information content carried out by the demodulated signals.

Alternatively, each interface 30 can comprise an own module 33, or a module 33 can be shared by more than one demodulator 20.

Figure 3:
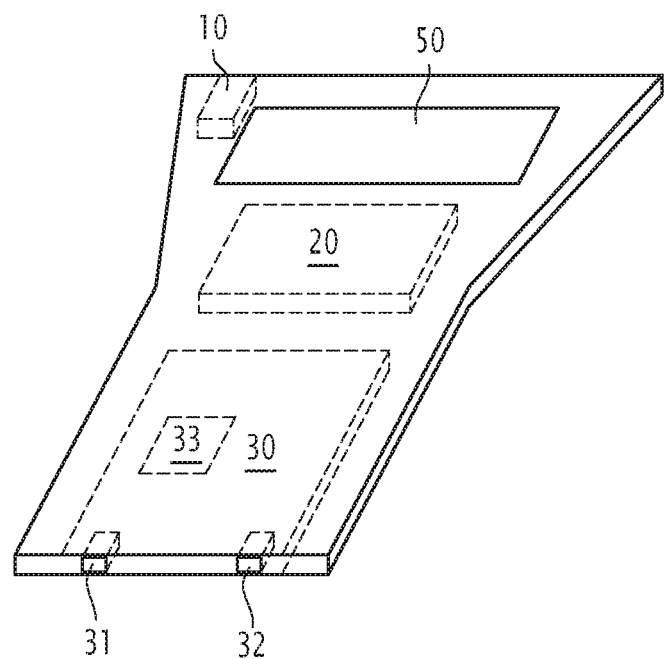
FIG. 3 schematically shows an exemplary embodiment of a portable track circuit signal analyzing device according to the present disclosure.

As illustrated in FIG. 3, the method 200 for analyzing signals travelling along track circuits of railway lines, comprises at least the following steps:
210: capturing, in a contactless manner, a plurality of signals travelling along a track circuit 1 via at least one antenna, for example an antenna 10;
220: separating into individual signals the plurality of signals captured by the at least one antenna 10 and selectively demodulating at least one of the separated signals via at least one demodulator, such as the demodulator 20; and
230: transferring, via an interface 30, data indicative of the at least one demodulated signal towards a user interface.

In particular, the step 130 of transferring comprises a sub-step 131 of graphically displaying on a screen 50 at least one of the demodulated signal and one or more parameters indicative of the information content carried out by the demodulated signal.

FIG. 3 schematically illustrates an exemplary embodiment of a portable track circuit signal analyzing device 300 realized according to the present disclosure and comprising at least:
an antenna 10 for contactlessly capturing a plurality of signals travelling along a track circuit 1;
at least one demodulator 20 adapted to separate into individual signals the plurality of signals captured by the at least one antenna 10 and selectively demodulate at least one of the separated signals, and
an interface 30 adapted at least for transferring, to a user interface, data indicative of the at least one demodulated signal.

In particular, as schematically illustrated in FIG. 3, the interface 30 further comprises a screen, like the screen 50 previously mentioned, and a module, i.e. the module 33 adapted to graphically display on the screen 50 at least one of the demodulated signal and one or more parameters indicative of the information content carried out by the demodulated signal.

Clearly, the antenna 10, the demodulator 20, the interface 30 and any part thereof can be those previously described with reference to the system of FIG. 1, and hereby not further described for the sake of conciseness.

Hence, it is evident that the system 100, the method 200, and the portable track circuit signal analyzing device 300, according to the present disclosure, enable to identify every signal carrier present on a track circuit, to demodulate the signals and analyze only a specific demodulated signal per time. In this way, it is possible for users to more precisely and correctly analyze the behaviour of a track circuit and in case to trigger any corrective action. These results are obtained with a solution relatively easy to be implemented according to flexible implementations. Further initial commissioning, tuning and maintenance operations are substantially simplified compared with current state of the art solutions, and can be executed leaving all transmitters operating on the track circuits, working in their normal conditions.

The system 100, the method 200, and the portable track circuit signal analyzing device 300, thus conceived are susceptible of modifications and variations, all of which are within the scope of the inventive concept as defined in particular by the appended claims; for example, some parts of the system 100, e.g. one or more of the described demodulator 20 and interface 30, may reside on the same unit, or they can be realized as subparts of a same component or circuit of an electronic unit, or they can be placed remotely from each other and in operative communication there between; the screen 50 and the module 33 can be part of a PC used by a. All the details may furthermore be replaced with technically equivalent elements.

What is claimed is:

1. A signal analyzing system for track circuits of railway lines, comprising:
   at least one antenna for contactlessly capturing a plurality of signals travelling along a track circuit,
   at least one demodulator adapted to separate into individual signals the plurality of signals captured by said at least one antenna and selectively demodulate at least one of the separated signals, and
   an interface adapted at least for transferring, to a user interface, data indicative of the at least one demodulated signal,
   wherein said at least one demodulator comprises a digital signal processor adapted to output signals including electrical parameters indicative of the at least one demodulated signal and an electronic board adapted to receive the signals output by the digital signal processor and transfer the received electrical signals towards said interface.

2. The signal analyzing system according to claim 1, wherein said at least one antenna is configured to capture signals travelling along the track circuit having a frequency in the range comprised between 50 Hz and 50 kHz, preferentially between 1 kHz and 20 kHz.

3. The signal analyzing system according to claim 1, wherein said least one antenna comprises an antenna selected from the group comprising a magnetic antenna, a capacitive antenna or a combination thereof.

4. The signal analyzing system according to claim 1, wherein said interface comprises a module adapted to graphically display on a screen at least one of the demodulated signal and one or more parameters indicative of the information content carried out by the demodulated signal.

5. The signal analyzing system according to claim 1, wherein said electronic board is adapted to automatically select the electrical signals indicative of a corresponding demodulated signal output by the digital signal processor to be transferred towards said interface.

6. The signal analyzing system according to claim 1, wherein it comprises a plurality of antennas positioned along the track circuit spaced apart from each other and a plurality of demodulators each operatively connected to an associated antenna of said plurality of antennas.

7. The signal analyzing system according to claim 4, wherein said module is adapted to detect an indicator contained in at least one demodulated signal indicative of a defective status of the track switch or part thereof.

8. A method for analyzing signals travelling along track circuits of railway lines, comprising at least the following steps:
   capturing, in a contactless manner, a plurality of signals travelling along a track circuit via at least one antenna,
   separating into individual signals the plurality of signals captured by said at least one antenna and selectively demodulating at least one of the separated signals via at least one demodulator, and
   transferring, via an interface, data indicative of the at least one demodulated signal towards a user interface,
   wherein said step of transferring comprises graphically displaying on a screen at least one of the demodulated signal and one or more parameters indicative of the information content carried out by the demodulated signal.

9. A portable track circuit signal analyzing device comprising at least:
   an antenna for contactlessly capturing a plurality of signals travelling along a track circuit,
   at least one demodulator adapted to separate into individual signals the plurality of signals captured by said at least one antenna and selectively demodulate at least one of the separated signals, and
   an interface adapted at least for transferring, to a user interface, data indicative of the at least one demodulated signal,
   wherein said interface further comprises a screen and a module adapted to graphically display on the screen at least one of the demodulated signal and one or more parameters indicative of the information content carried out by the demodulated signal.

* * * * *